United States Patent
Kuo

(10) Patent No.: US 11,707,822 B2
(45) Date of Patent: Jul. 25, 2023

(54) TORQUE STRUCTURE

(71) Applicant: Wen-Chin Kuo, Taichung (TW)

(72) Inventor: Wen-Chin Kuo, Taichung (TW)

(*) Notice: Subject to any disclaimer, the term of this patent is extended or adjusted under 35 U.S.C. 154(b) by 150 days.

(21) Appl. No.: 17/366,297

(22) Filed: Jul. 2, 2021

(65) Prior Publication Data

US 2023/0001547 A1 Jan. 5, 2023

(51) Int. Cl.
*B25B 23/142* (2006.01)
*B25B 23/14* (2006.01)
*F16D 7/04* (2006.01)
B25B 13/08 (2006.01)
B25B 13/46 (2006.01)
B25B 13/04 (2006.01)

(52) U.S. Cl.
CPC ........ *B25B 23/1427* (2013.01); *B25B 23/141* (2013.01); *F16D 7/044* (2013.01); *B25B 13/04* (2013.01); *B25B 13/08* (2013.01); *B25B 13/463* (2013.01)

(58) Field of Classification Search
CPC ............. B25B 23/1427; B25B 23/141; B25B 23/0035; B25B 23/0007; B25B 23/142; B25B 13/04; B25B 13/08; B25B 13/463; B25B 13/06; F16D 7/044
USPC ....... 81/472–478, 177.8, 177.9, 177.75, 467, 81/59.1
See application file for complete search history.

(56) References Cited

U.S. PATENT DOCUMENTS

| 2,895,359 | A | * | 7/1959 | Nelson | ............. B25B 15/04 81/57.39 |
| 6,105,473 | A | * | 8/2000 | Huang | .............. B25B 23/005 81/177.8 |
| 8,863,624 | B2 | | 10/2014 | Chen | |
| 2022/0143793 | A1 | * | 5/2022 | Abel | .............. B25B 23/141 |

FOREIGN PATENT DOCUMENTS

TW M492808 U 1/2015

* cited by examiner

*Primary Examiner* — Don M Anderson
*Assistant Examiner* — Robert C Moore
(74) *Attorney, Agent, or Firm* — Alan D. Kamrath; Karin L. Williams; Mayer & Williams PC

(57) ABSTRACT

A torque structure includes a first body, a second body, a first elastic member, a third body, and a limit unit. The second body is provided with a second receiving chamber, a first pivot portion, at least one first positioning portion and at least one second positioning portion. The first elastic member is received in the second receiving chamber. The third body is provided with a drive portion, a pivot seat, a second pivot portion, and a first limit portion. The limit unit is assembled with the second body and the third body and rotated between a disengaging position where the third body is unlocked from the second body and has a torque slip function relative to the second body, and a engaging position where the third body is locked by the second body and does not have a torque slip function.

9 Claims, 10 Drawing Sheets

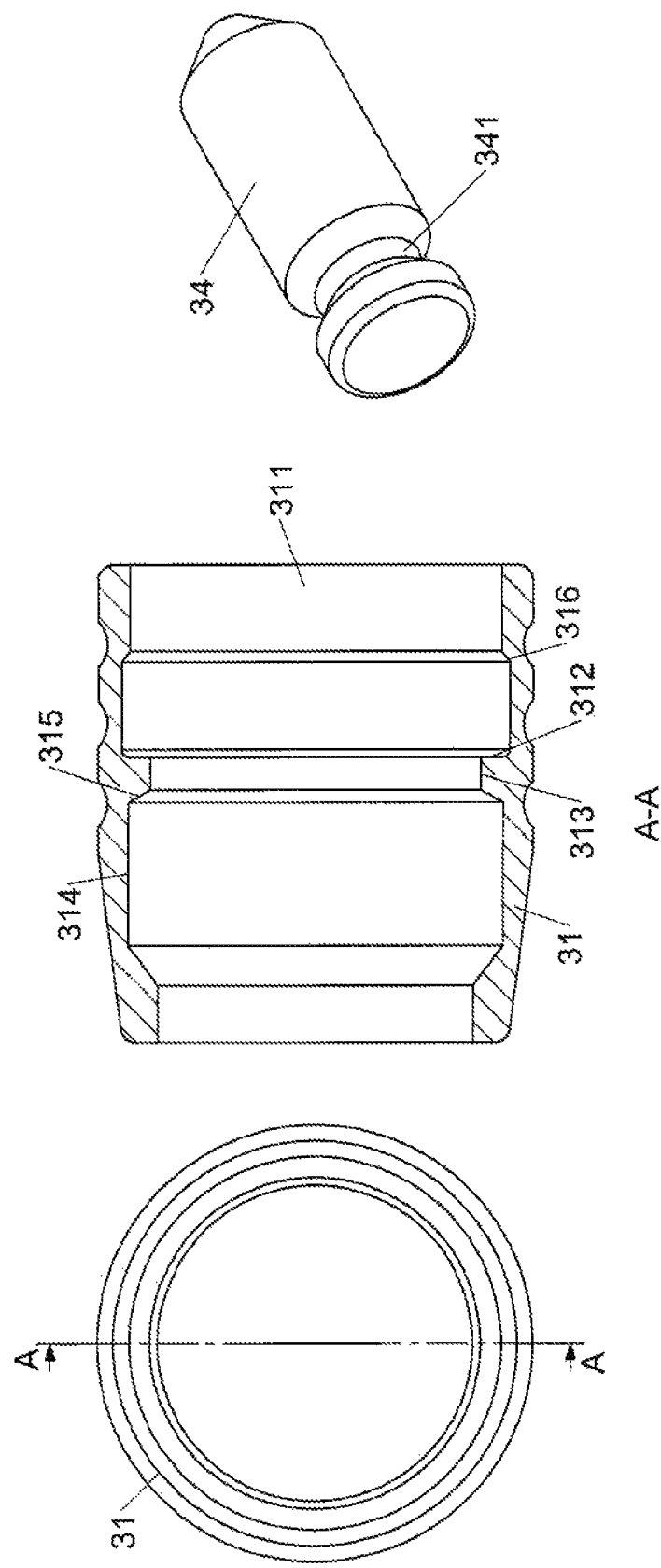

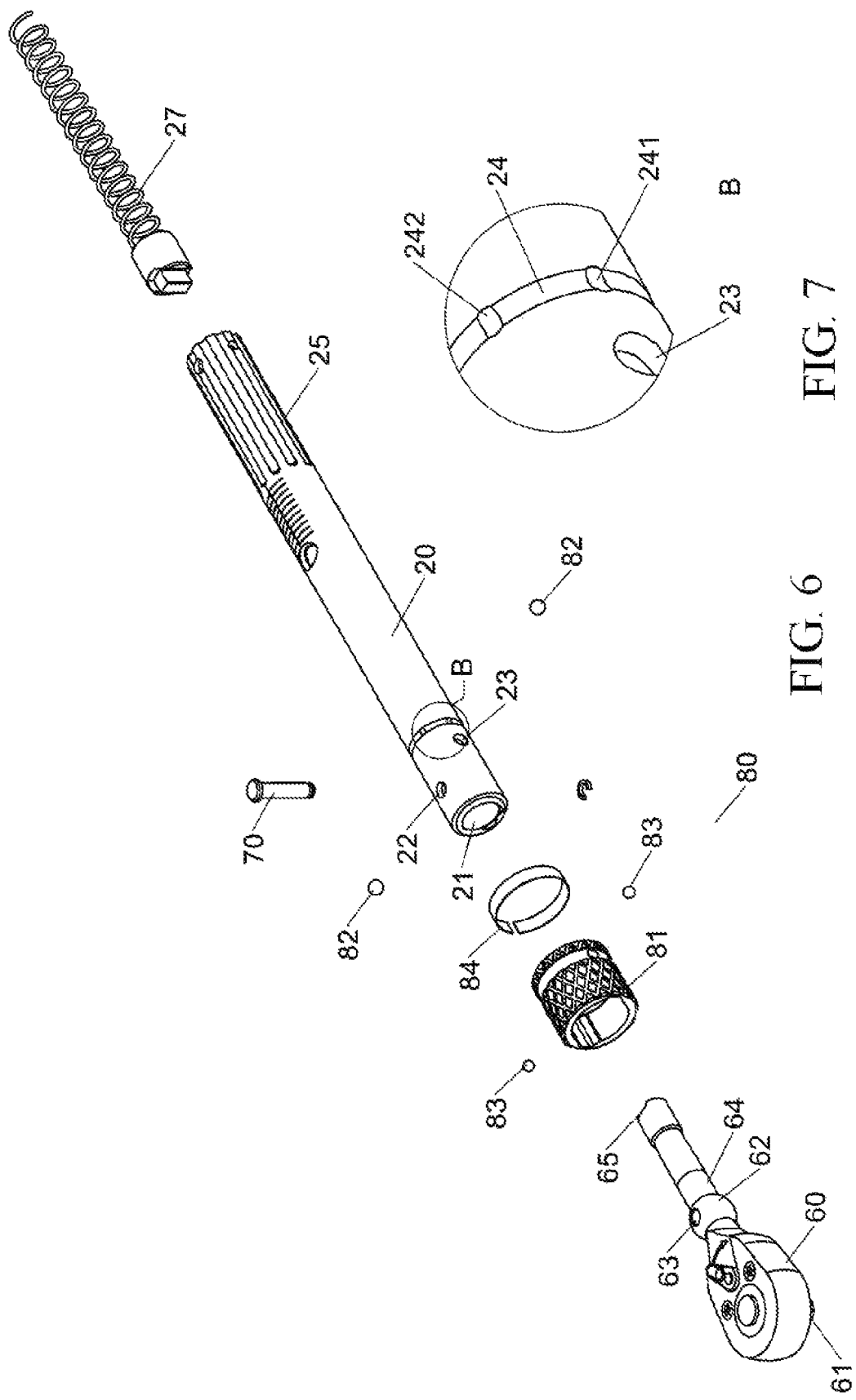

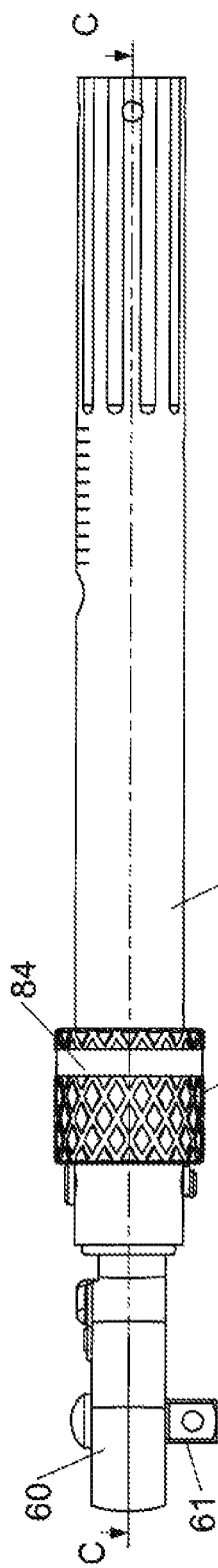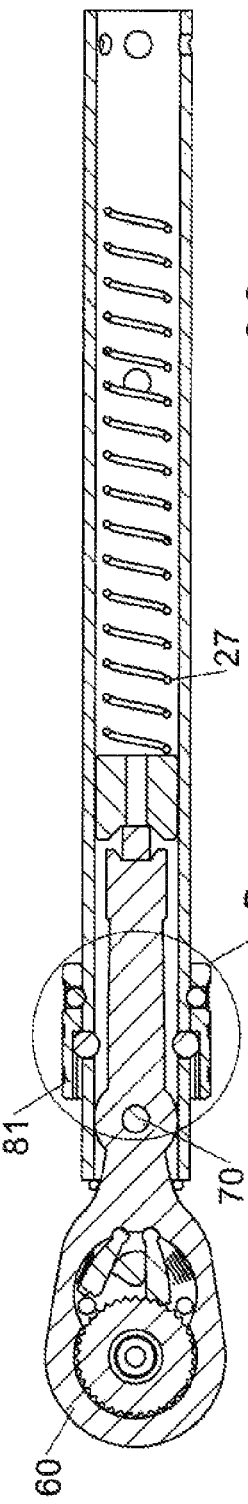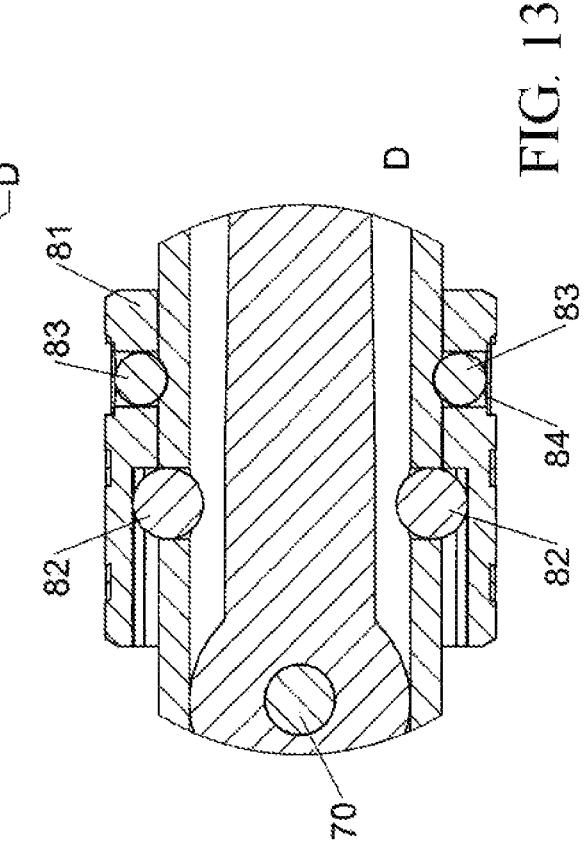

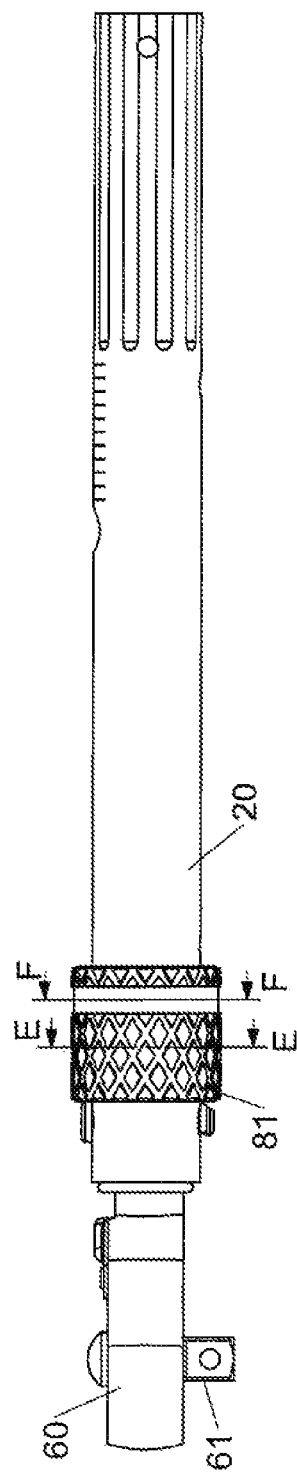
FIG. 14
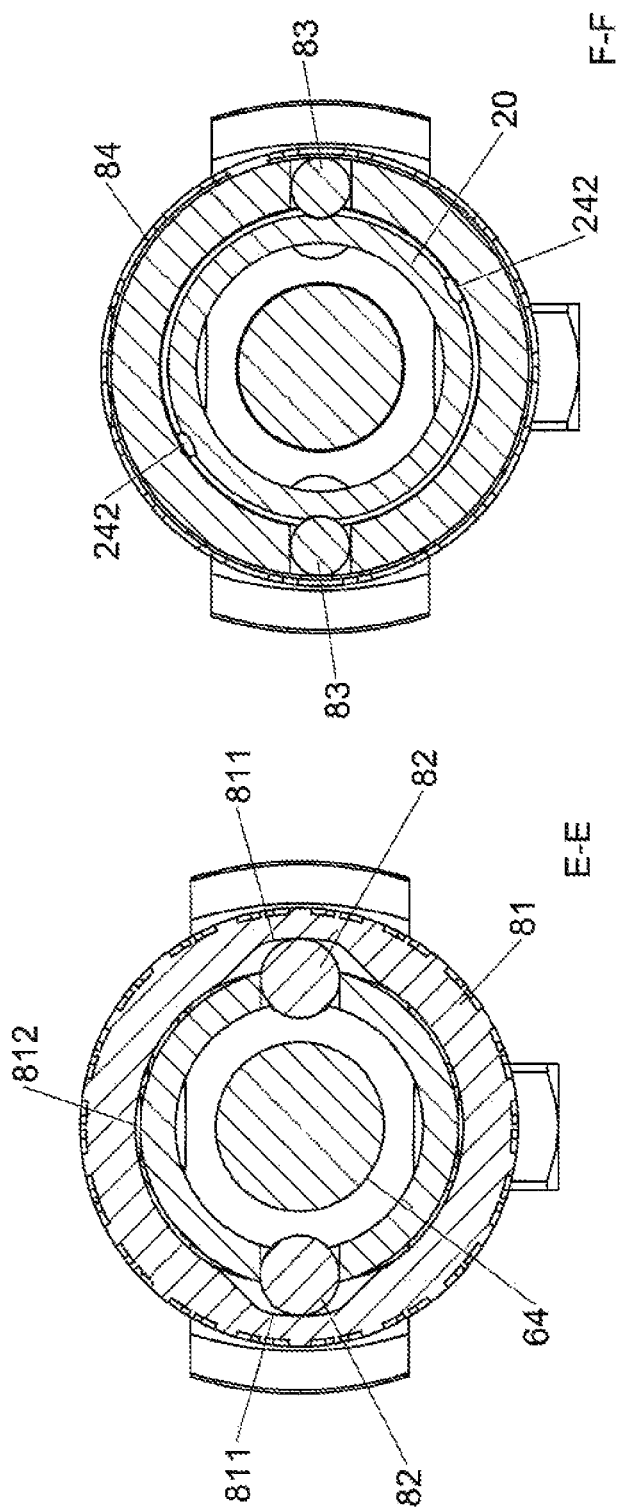
FIG. 15
FIG. 16

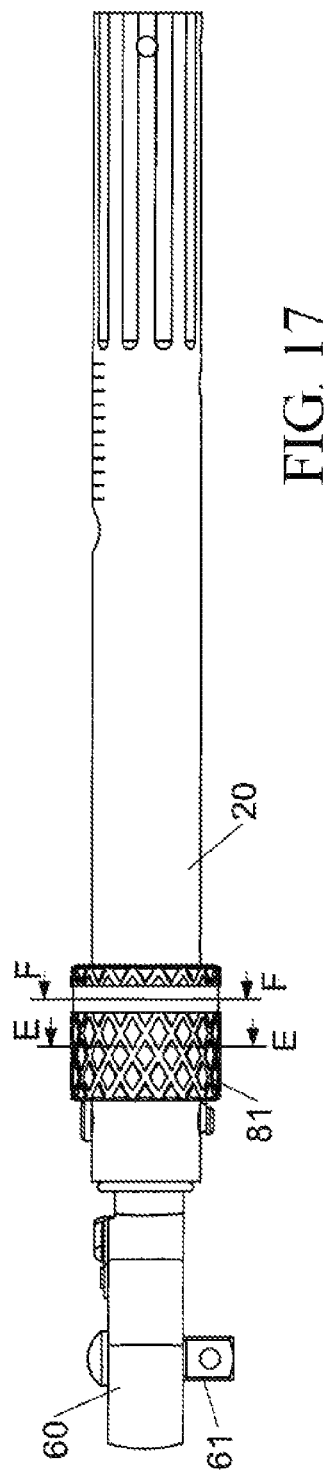
FIG. 17
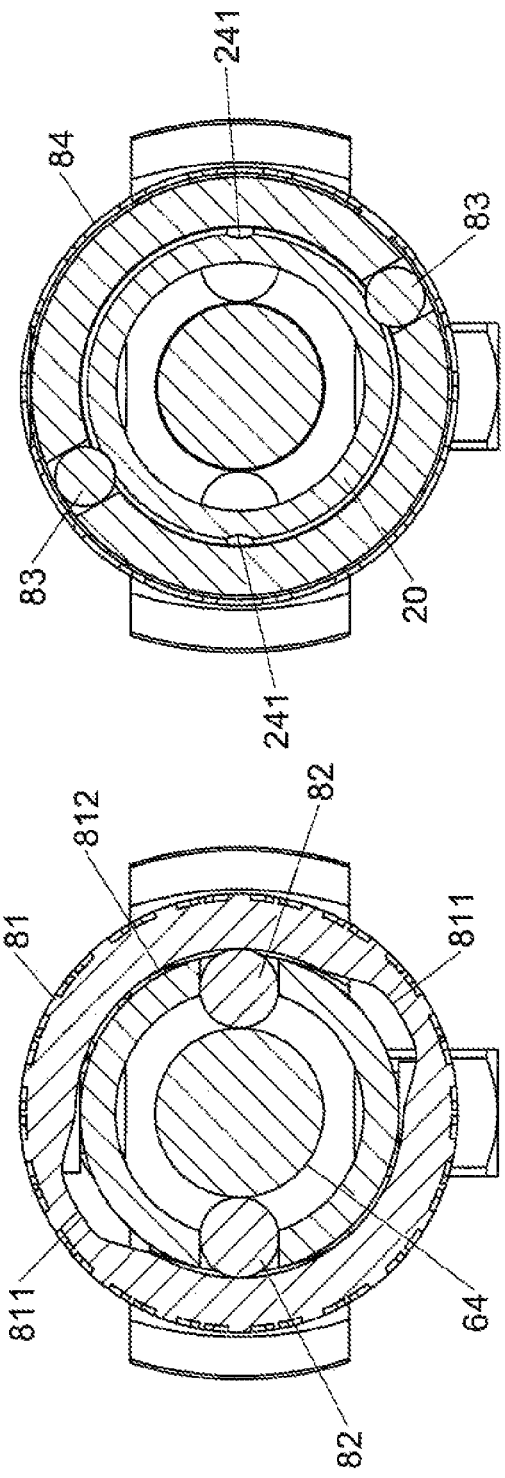
FIG. 19
FIG. 18

TORQUE STRUCTURE

BACKGROUND OF THE INVENTION

1. Field of the Invention

The present invention relates to a hand tool and, more particularly, to a torque structure.

2. Description of the Related Art

A conventional torque wrench was disclosed in the applicant's assigned U.S. Pat. No. 8,863,624 (or Taiwanese Patent No. M492808), and comprises a hollow main shaft 10, a tool member 20, an adjustable grip 30, a torque-adjustment elastic member 40, a clutch device 50, and a functional lock 60. The hollow main shaft 10 comprises a first end 11, a second end 12, a plurality of locating grooves 13, and plural torque value numbers 14. The tool member 20 comprises a head piece 21 and a stem 22. The adjustable grip 30 comprises an adjustment screw member 31 with a ring groove 301. The functional lock 60 comprises a locking ring 61, a compression spring 62, a C-clasp 63, at least a through hole 64, and at least a positioning ball 65. Referring to FIG. 5, when the functional lock 60 is in the locked position, the compression spring 62 pushes the locking ring 61 toward the tool member 20, whereby the positioning ball 65 is pushed by the pushing face 612 and stopped by the locating groove 13 for limiting the rotation of the adjustable grip 30. Referring to FIG. 7 and FIG. 8, when the functional lock 60 is in the unlocked position, the compression spring 62 is compressed due to the movement of the locking ring 61, whereby the C-clasp 63 is coupled with the annular groove 614 for positioning the locking ring 61 in the unlocked position. At the meantime, the positioning ball 65 is no longer pushed by the pushing face 612 and is aligned with the position of the bevel 616, whereby the positioning ball 65 is allowed to move between the containing groove 611 and the locating groove 13. Therefore, during the switching process of the locking ring 61, a percussion sound is produced by the medal C-clasp 63 coupled with the annular groove 614, and another percussion sound is also produced when the pushing face 612 pushes the positioning ball 65.

However, such a conventional torque wrench has the following disadvantage. When the functional lock 60 is in the unlocked position, the adjustable grip 30 is rotated about its axis to drive the hollow main shaft 10 and the tool member 20, so that the tool member 20 has a torque slip function relative to the hollow main shaft 10 when the hollow main shaft 10 and the tool member 20 are rotated. The conventional torque wrench does not have a control mechanism to limit operation of the clutch device 50, so that the conventional torque wrench only has a torque effect, thereby limiting the versatility thereof.

BRIEF SUMMARY OF THE INVENTION

In accordance with the present invention, there is provided a torque structure comprising a first body, a second body, a first elastic member, a third body, and a limit unit. The second body is provided with a second receiving chamber, a first pivot portion, two retaining grooves, a first groove, at least one first positioning portion and at least one second positioning portion. The first elastic member is received in the second receiving chamber. The third body is provided with a drive portion, a pivot seat, a second pivot portion, and a first limit portion. The limit unit is assembled with the second body and the third body and rotated between a disengaging position where the third body is unlocked from the second body and has a torque slip function relative to the second body, and a engaging position where the third body is locked by the second body and does not have a torque slip function relative to the second body.

According to the primary advantage of the present invention, the limit unit is rotated on the second body between a disengaging position where the third body is unlocked from the second body and has a torque slip function relative to the second body and a engaging position where the third body is locked by the second body and does not have a torque slip function relative to the second body. When the limit unit is disposed at the disengaging position, the torque structure is served as a torque wrench structure. When the limit unit is disposed at the engaging position, the third body is restricted by the limit unit, and the resting portion cannot be moved, so that the third body does not have a torque slip effect relative to the second body, and the torque structure is served as a common wrench structure. Thus, the torque structure has two different functions to enhance the versatility thereof.

Further benefits and advantages of the present invention will become apparent after a careful reading of the detailed description with appropriate reference to the accompanying drawings.

BRIEF DESCRIPTION OF THE SEVERAL VIEWS OF THE DRAWING(S)

FIG. 3 is a side view of the control unit of the torque structure of the present invention.

FIG. 4 is a cross-sectional view of the control unit of the torque structure taken along line A-A as shown in FIG. 3.

FIG. 5 is a perspective view of a positioning member of the torque structure in accordance with the preferred embodiment of the present invention.

FIG. 6 is a partial exploded perspective view of the torque structure in accordance with the preferred embodiment of the present invention.

FIG. 7 is a locally enlarged view of the torque structure taken along a circle B as shown in FIG. 6.

FIG. 11 is a partial side view of the torque structure in accordance with the preferred embodiment of the present invention.

FIG. 12 is a cross-sectional view of the torque structure taken along line C-C as shown in FIG. 11.

FIG. 13 is a locally enlarged view of the torque structure taken along a circle D as shown in FIG. 12.

FIG. 14 is a partial side view of the torque structure in accordance with the preferred embodiment of the present invention.

FIG. 15 is a cross-sectional view of the torque structure taken along line E-E as shown in FIG. 14.

FIG. 16 is a cross-sectional view of the torque structure taken along line F-F as shown in FIG. 14.

FIG. 17 is a partial side view of the torque structure showing another operational state of the present invention.

FIG. 18 is a cross-sectional view of the torque structure taken along line E-E as shown in FIG. 17.

FIG. 19 is a cross-sectional view of the torque structure taken along line F-F as shown in FIG. 17.

DETAILED DESCRIPTION OF THE INVENTION

Figure 1:
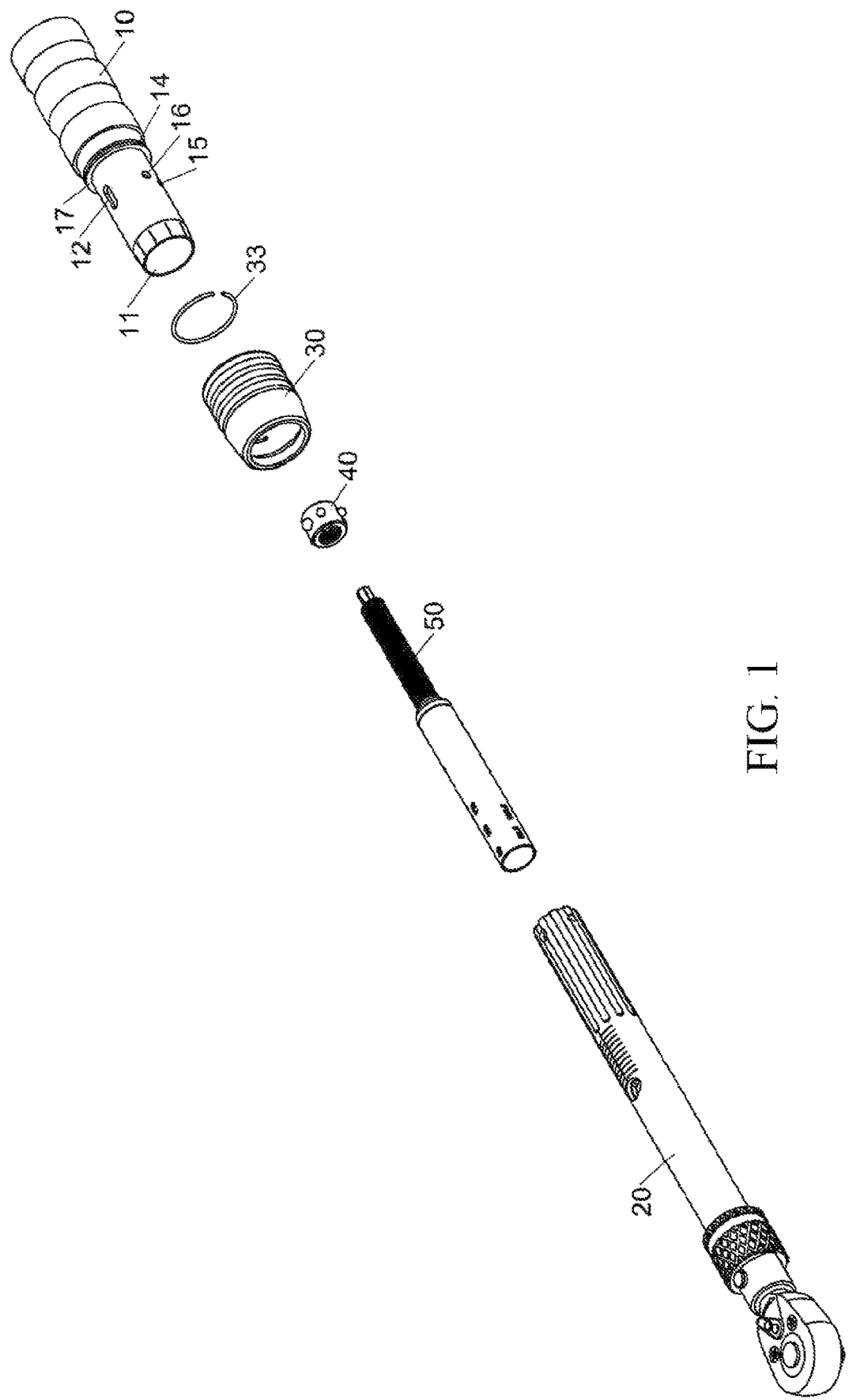
FIG. 1 is an exploded perspective view of a torque structure in accordance with the preferred embodiment of the present invention.
Figure 2:
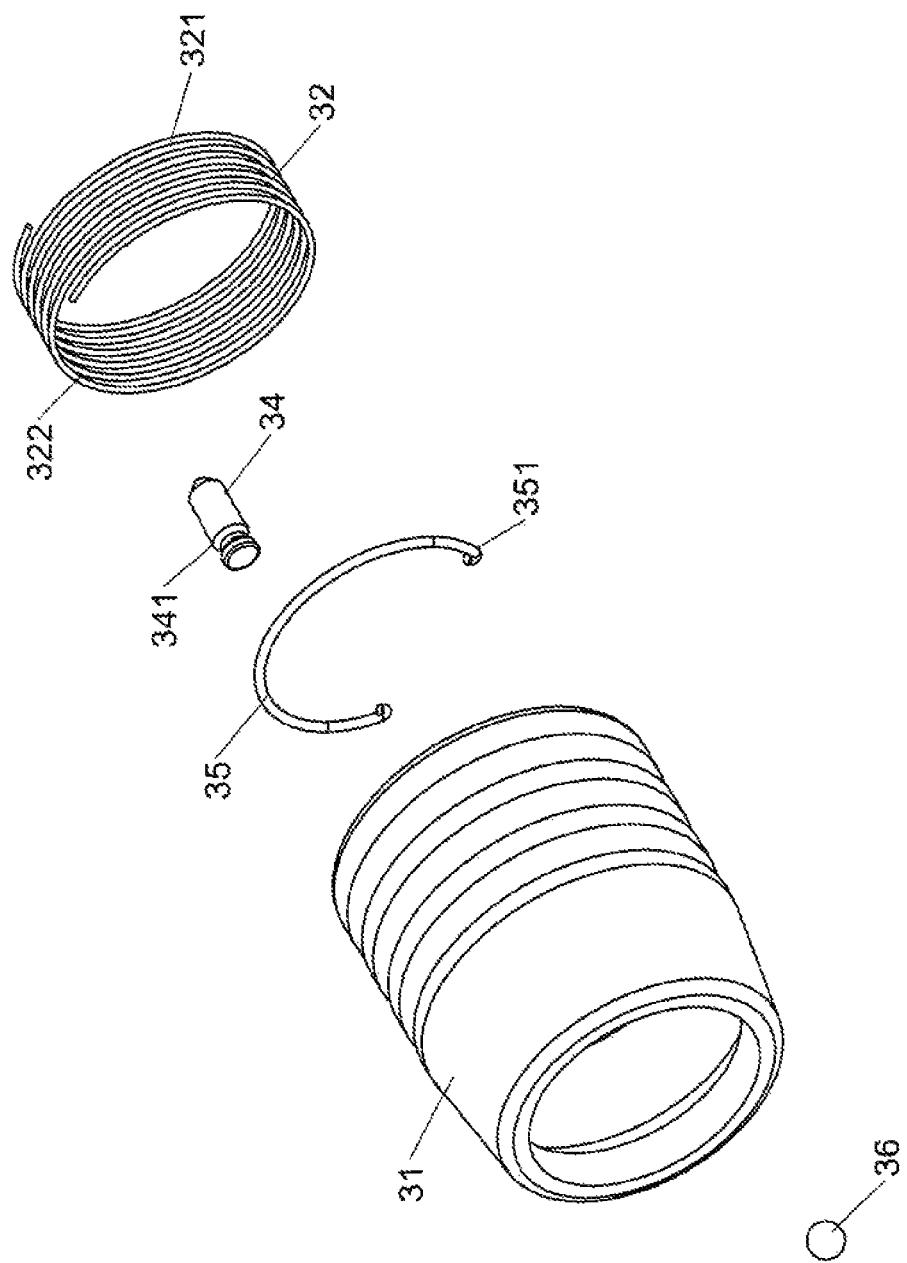
FIG. 2 is an exploded perspective view of a control unit of the torque structure in accordance with the preferred embodiment of the present invention.

Referring to the drawings and initially to FIGS. 1-10, a torque structure in accordance with the preferred embodiment of the present invention comprises a first body 10, a second body 20, a first elastic member 27, a control unit 30, a fixing seat unit (or holder) 40, an adjusting unit 50, a third body 60, a pivot rod 70, and a limit unit 80.

The first body 10 is a circular rod having an end provided with a handle. The first body 10 has an interior provided with a first receiving chamber 11 having a circular shape. The first body 10 is provided with a slot 12 connected to the first receiving chamber 11. The slot 12 has an elongate shape. The first body 10 is provided with a first annular groove 14. The first body 10 is provided with two receiving recesses 15 that are symmetrical relative to the slot 12. The first body 10 is provided with a ball hole 16 connected to the first receiving chamber 11. The ball hole 16 and the slot 12 form an angle of ninety degrees (90°) therebetween relative to an axis of the first body 10. The ball hole 16 has a circular shape and is arranged beside one of the two receiving recesses 15. The first body 10 is provided with a first abutting edge 17 arranged between the first annular groove 14 and the slot 12.

The second body 20 is assembled with the first body 10. The second body 20 is a circular rod and has an interior provided with a second receiving chamber 21 which has a circular shape and extends through a whole length of the second body 20. The second body 20 has a first end provided with a first pivot portion 22, two retaining grooves 23, and a first groove 24. The first pivot portion 22 is connected to the second receiving chamber 21 and distant from the first body 10. The first pivot portion 22 is a circular hole adjacent to an end opening of the second receiving chamber 21. The first pivot portion 22 has an axis perpendicular to that of the second receiving chamber 21. Each of the two retaining grooves 23 and the first pivot portion 22 form an angle of ninety degrees (90°) therebetween relative to an axis of the second receiving chamber 21. The two retaining grooves 23 are connected to the second receiving chamber 21 and have an axis perpendicular to that of the second receiving chamber 21. The two retaining grooves 23 are adjacent to the first pivot portion 22 and are arranged symmetrically. Each of the two retaining grooves 23 is a circular hole. The first groove 24 has an annular shape. The first groove 24 is adjacent to the two retaining grooves 23 which are arranged between the first pivot portion 22 and the first groove 24. The first groove 24 is provided with at least one first positioning portion 241 and at least one second positioning portion 242. Each of the at least one first positioning portion 241 and the at least one second positioning portion 242 is an arcuate recess that has a depth slightly more than that of the first groove 24. Preferably, the first groove 24 is provided with two first positioning portions 241 and two second positioning portions 242. The at least one first positioning portion 241 and the at least one second positioning portion 242 are arranged in an annular alternating manner about the axis of the second receiving chamber 21. The second body 20 has a second end provided with a plurality of positioning channels 25 hidden in the first receiving chamber 11. The first body 10 is rotated relative to the second body 20 until the slot 12 aligns with one of the positioning channels 25. The positioning channels 25 are arranged in an annular manner about the axis of the second body 20 and are distant from the first pivot portion 22, the two retaining grooves 23, and the first groove 24. Each of The positioning channels 25 has an arcuate shape.

The first elastic member 27 is received in the second receiving chamber 21.

The control unit 30 is mounted on the first body 10 and movable between a locking position where the first body 10 cannot be rotated relative to the second body 20 so that the torque state cannot be adjusted, and an unlocking position where the first body 10 can be rotated relative to the second body 20 so that the torque state can be adjusted. The control unit 30 includes a control sleeve 31, a second elastic member 32, a first ring 33, a positioning member 34, a second ring 35, and a ball 36.

The control sleeve 31 is a metal ring mounted on the first body 10 and movable axially on the first body 10 between a locking position and an unlocking position. The control sleeve 31 has an interior provided with a spring recess 311. The spring recess 311 extends to a rear end of the control sleeve 31 and forms an opening facing the handle of the first body 10. The spring recess 311 has a bottom provided with a second abutting edge 312. The control sleeve 31 is provided with a first peripheral face 313 and a second peripheral face 314. The second abutting edge 312 is arranged between the spring recess 311 and the first peripheral face 313. The first peripheral face 313 has a diameter less than that of the spring recess 311 and is arranged between the second abutting edge 312 and the second peripheral face 314. The second peripheral face 314 has a diameter more than that of the first peripheral face 313. The control sleeve 31 is provided with a first conic groove 315 which is arranged between the first peripheral face 313 and the second peripheral face 314 and enlarged from the first peripheral face 313 to the second peripheral face 314. The first peripheral face 313 is arranged between the second abutting edge 312 and the first conic groove 315. The control sleeve 31 is provided with a second conic groove 316 which is arranged in the spring recess 311. The second conic groove 316 is enlarged from the opening of the spring recess 311 to the second abutting edge 312. The second abutting edge 312 is arranged between the first peripheral face 313 and the second conic groove 316. Thus, the spring recess 311, the second conic groove 316, the second abutting edge 312, the first peripheral face 313, the first conic groove 315, and the second peripheral face 314 are arranged serially in the control sleeve 31.

The second elastic member 32 is mounted on the first body 10 and elastically biased against the control sleeve 31 to push the control sleeve 31 from the unlocking position to the locking position. The second elastic member 32 is received in the spring recess 311 and has a first end 321 elastically biased against the first abutting edge 17 and a second end 322 elastically biased against the second abutting edge 312.

The first ring 33 is mounted in the first annular groove 14 and hidden in the control sleeve 31. The first ring 33 is elastically expandable outward. The first ring 33 rests on a peripheral face of the spring recess 311 when the control sleeve 31 is axially moved to the locking position, and is expanded outward to rest on the second conic groove 316 when the control sleeve 31 is axially moved to the unlocking position.

The positioning member 34 is made of metal and has a cylindrical shape. The positioning member 34 is received in the slot 12 and hidden in the control sleeve 31. The positioning member 34 is releasably locked in one of the positioning channels 25. The positioning member 34 is provided with a second annular groove 341 and a conic portion formed on two ends thereof. The conic portion is directed toward the second elastic member 32.

The second ring 35 is mounted on the first body 10 and the second annular groove 341 and has an elastic restoring force. The second ring 35 has two receiving portions 351 formed on two ends thereof and received in the two receiving recesses 15 so that the second ring 35 is secured to the first body 10 without detachment. The positioning member 34 is limited by the second ring 35 which prevent the positioning member 34 from being detached from the slot 12.

The ball 36 is received in the ball hole 16 and hidden in the control sleeve 31. The ball 36 rests on the first conic groove 315 of the control sleeve 31. The control sleeve 31 is limited by the ball 36 which prevents the control sleeve 31 from being detached from the first body 10.

When the control sleeve 31 is situated at the locking position, the second elastic member 32 pushes the control sleeve 31 toward the first pivot portion 22, so that the first ring 33 rests on the peripheral face of the spring recess 311. One end of the positioning member 34 is pressed by the first peripheral face 313, and the positioning member 34 is partially retracted into the slot 12, so that the positioning member 34 is locked in one of the positioning channels 25. Thus, the first body 10 and the second body 20 are locked by the positioning member 34, so that the first body 10 cannot be rotated relative to the second body 20. The other end of the positioning member 34 aligns with the second peripheral face 314 and the first conic groove 315, and the ball 36 partially protrudes from the ball hole 16 and rests on the first conic groove 315.

When the control sleeve 31 is moved on the first body 10 in a direction opposite to the second body 20 toward the unlocking position, the second elastic member 32 is compressed by the second abutting edge 312, and the first ring 33 is detached from the peripheral face of the spring recess 311 so that the first ring 33 is expanded outward and rests on the second conic groove 316, and the control sleeve 31 is situated at the unlocking position by the first ring 33. One end of the positioning member 34 is detached from the first peripheral face 313, the positioning member 34 is only restricted by the second ring 35, and the ball 36 is distant from the first conic groove 315, so that the first body 10 can be rotated relative to the second body 20, and the positioning member 34 is moved on the second body 20 and positioned in any one of the positioning channels 25. The positioning member 34 is pushed by the wall of the second body 20, and the second ring 35 is pushed and expanded outward by the positioning member 34 when the first body 10 is rotated relative to the second body 20. When the positioning member 34 is moved from one to another one of the positioning channels 25, the positioning member 34 is pressed inward by the restoring force of the second ring 35, so that the positioning member 34 is retracted into another one of the positioning channels 25. Thus, a clear sound is produced when the positioning member 34 is forced into and locked in each of the positioning channels 25 to provide an audio indication to the user.

The fixing seat unit 40 is secured in the second receiving chamber 21 and close to the opening of the second receiving chamber 21. The fixing seat unit 40 is distant from the first pivot portion 22.

The adjusting unit 50 is assembled with the first body 10, the second body 20, and the fixing seat unit 40. The adjusting unit 50 has a first end secured in the first receiving chamber 11 and a second end biased against the first elastic member 27. The adjusting unit 50 is screwed into and movable relative to the fixing seat unit 40. When the first body 10 is rotated and moved relative to the second body 20, the adjusting unit 50 is driven by the first body 10 to rotate and move relative to the fixing seat unit 40, so that the adjusting unit 50 is moved axially in the second receiving chamber 21 to adjust the length and tension of the first elastic member 27.

The third body 60 is pivotally connected with the second body 20 and has a first end provided with a drive portion 61 protruding from the second body 20. The drive portion 61 is a ratchet wrench mechanism, a two-way ratchet wrench mechanism, a one-way ratchet wrench mechanism, a closed-end wrench, an open-end wrench or the like. The third body 60 is provided with a pivot seat 62 pivotally mounted in the second receiving chamber 21. The pivot seat 62 is a spherical body and provided with a second pivot portion 63 pivotally connected with the first pivot portion 22. The second pivot portion 63 is a circular hole. The third body 60 is provided with a first limit portion 64 aligning with the two retaining grooves 23. The first limit portion 64 is connected with the pivot seat 62 which is arranged between the drive portion 61 and the first limit portion 64. The first limit portion 64 is an annular face or an annular groove. The third body 60 has a second end provided with a resting portion 65 biased against the first elastic member 27 so that the third body 60 has a torque slip (or release or freeing) function relative to the second body 20. The first elastic member 27 is biased between the adjusting unit 50 and the resting portion 65. The first limit portion 64 is arranged between the pivot seat 62 and the resting portion 65.

The pivot rod 70 extends through the first pivot portion 22 and the second pivot portion 63 so that the second pivot portion 63 is pivotally connected with the first pivot portion 22, and the third body 60 is pivotally connected with the second body 20. The pivot rod 70 is a circular pin.

The limit unit 80 is assembled with the second body 20 and the third body 60. The limit unit 80 is rotated on the second body 20 between a disengaging (or non-limit) position where the third body 60 is unlocked from the second body 20 and has a torque slip function relative to the second body 20 and an engaging (or limit) position where the third body 60 is locked by the second body 20 and does not have a torque slip function relative to the second body 20. The limit unit 80 includes a first retaining member 81, two second retaining members 82, at least one positioning ball 83, and an elastomer 84.

The first retaining member 81 is pivotally mounted on the second body 20 and rotatable relative to the second body 20 through three hundred and sixty degrees (360°). The first retaining member 81 has an inner peripheral face provided with two second limit portions 811 and two third limit portions 812. Each of the two second limit portions 811 is connected to each of the two third limit portions 812 and has a depth more than that of each of the two third limit portions 812. The two second limit portions 811 align with each other, and the two third limit portions 812 align with each other. Each of the two second limit portions 811 is a recessed arcuate face, and each of the two third limit portions 812 is an arcuate face. The first retaining member 81 has an outer peripheral face provided with a second groove 813. The second groove 813 has an annular shape and is provided with at least one through hole 814 aligning with the at least one first positioning portion 241 or the at least one second positioning portion 242. The at least one through hole 814 has a number corresponding to that of the at least one first positioning portion 241 and the at least one second positioning portion 242. Preferably, the second groove 813 is provided with two through holes 814. The at least one through hole 814 is a circular hole and has an axis perpendicular to that of the first retaining member 81. The first retaining member 81 has an exterior provided with a serrated portion to facilitate the user holding and rotating the first retaining member 81.

The two second retaining members 82 are received in the two retaining grooves 23 and hidden in the first retaining member 81. The first limit portion 64 is arranged between the two second retaining members 82 which are arranged symmetrically. When the first retaining member 81 is rotated on the second body 20, the two second retaining members 82 align with the two second limit portions 811 or the two third limit portions 812, so that the two second retaining members 82 are unlocked from or locked onto the first limit portion 64, and the third body 60 is released from or restricted by the second body 20. Each of the two second retaining members 82 is a spherical ball.

The at least one positioning ball 83 is received in the first groove 24 and the at least one through hole 814. When the first retaining member 81 is rotated on the second body 20, the at least one positioning ball 83 is rolled in the first groove 24. When the at least one through hole 814 aligns with the at least one first positioning portion 241 or the at least one second positioning portion 242, the at least one positioning ball 83 is positioned in the at least one first positioning portion 241 or the at least one second positioning portion 242, so that the first retaining member 81 and the limit unit 80 are situated at the disengaging position or the engaging position. The at least one positioning ball 83 has a number corresponding to that of the at least one through hole 814. Preferably, the limit unit 80 includes two positioning balls 83.

The elastomer 84 is received in the second groove 813 and presses the at least one positioning ball 83 so that the at least one positioning ball 83 is hidden in the first retaining member 81. The elastomer 84 retains the at least one positioning ball 83 to prevent the at least one positioning ball 83 from being detached from the first retaining member 81. The elastomer 84 has an annular shape. When the at least one positioning ball 83 is received in the first groove 24, the elastomer 84 is pushed and expanded outward by the at least one positioning ball 83. Thus, the elastomer 84 provides an elastic damping force to the at least one positioning ball 83 when the at least one positioning ball 83 is rolled and moved in the first groove 24.

When the first retaining member 81 is rotated on the second body 20 to the disengaging position of the limit unit 80, the two second limit portions 811 align with the two retaining grooves 23, and the two second retaining members 82 align with the two second limit portions 811 as shown in FIG. 15, so that the two second retaining members 82 are unlocked from the first limit portion 64, and the third body 60 is unlocked from the limit unit 80 and released from the second body 20. At this time, the at least one through hole 814 aligns with the at least one first positioning portion 241, and the at least one positioning ball 83 is pressed by the elastomer 84 and positioned in the at least one first positioning portion 241 as shown in FIG. 16, so that the first retaining member 81 is situated at the disengaging position of the limit unit 80. Thus, the first pivot portion 22 is served as a fulcrum, and the third body 60 is pivoted about the first pivot portion 22 and swiveled or swayed through an angle, so that the third body 60 has a torque slip effect relative to the second body 20.

Alternatively, when the first retaining member 81 is rotated on the second body 20 to the engaging position of the limit unit 80, the two third limit portions 812 align with the two retaining grooves 23, and the two second retaining members 82 are pushed by the two third limit portions 812 to press the first limit portion 64 as shown in FIG. 18, so that the first limit portion 64 is sandwiched between the two second retaining members 82, and the third body 60 is locked by the limit unit 80 and secured to the second body 20. Thus, the third body 60 is restricted by the limit unit 80 so that the resting portion 65 cannot be moved, and the third body 60 is situated at an engaged state (or a limited state) relative to the second body 20. At this time, the at least one through hole 814 aligns with the at least one second positioning portion 242, and the at least one positioning ball 83 is pressed by the elastomer 84 and positioned in the at least one second positioning portion 242 as shown in FIG. 19, so that the first retaining member 81 is situated at the engaging position of the limit unit 80. Thus, the third body 60 does not have a torque slip effect relative to the second body 20. The torque structure is a wrench structure.

Figure 9:
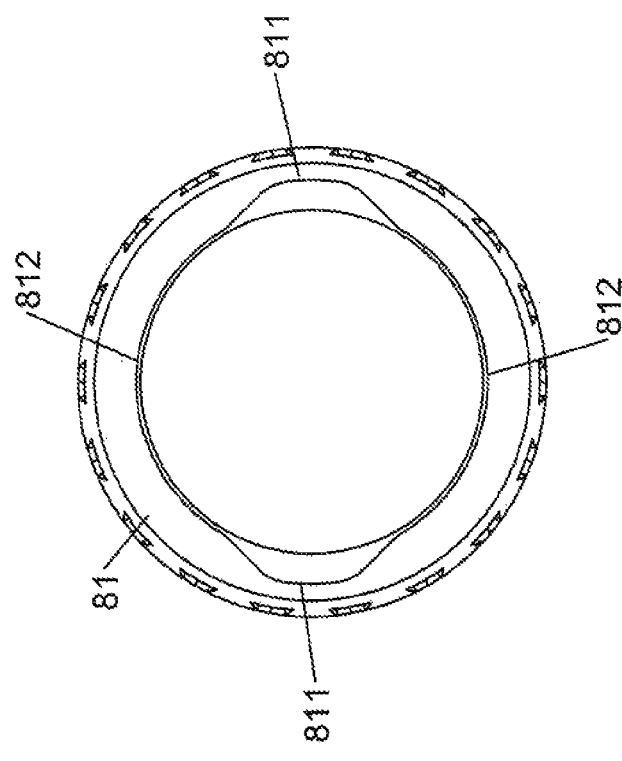
FIG. 9 is a front view of the first retaining member of the torque structure as shown in FIG. 8.
Figure 8:
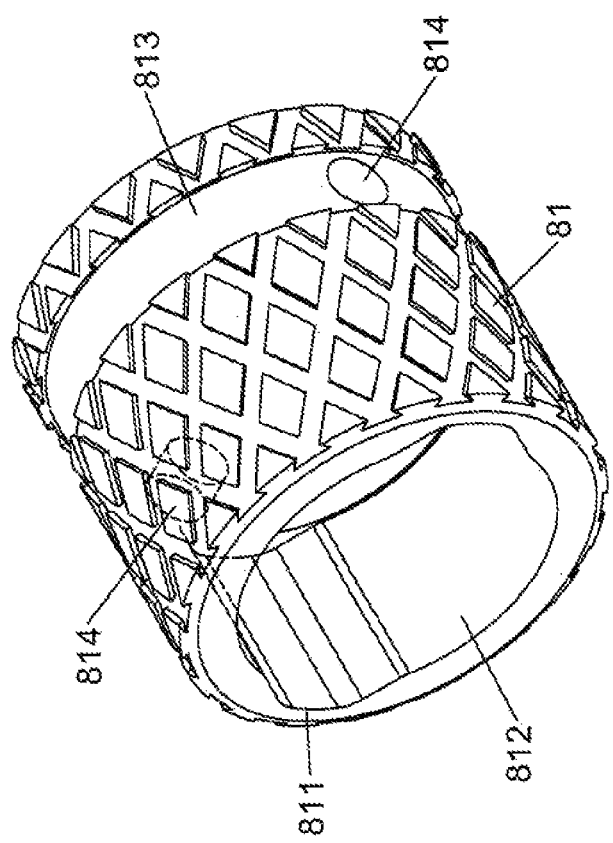
FIG. 8 is a perspective view of a first retaining member of the torque structure in accordance with the preferred embodiment of the present invention.
Figure 10:
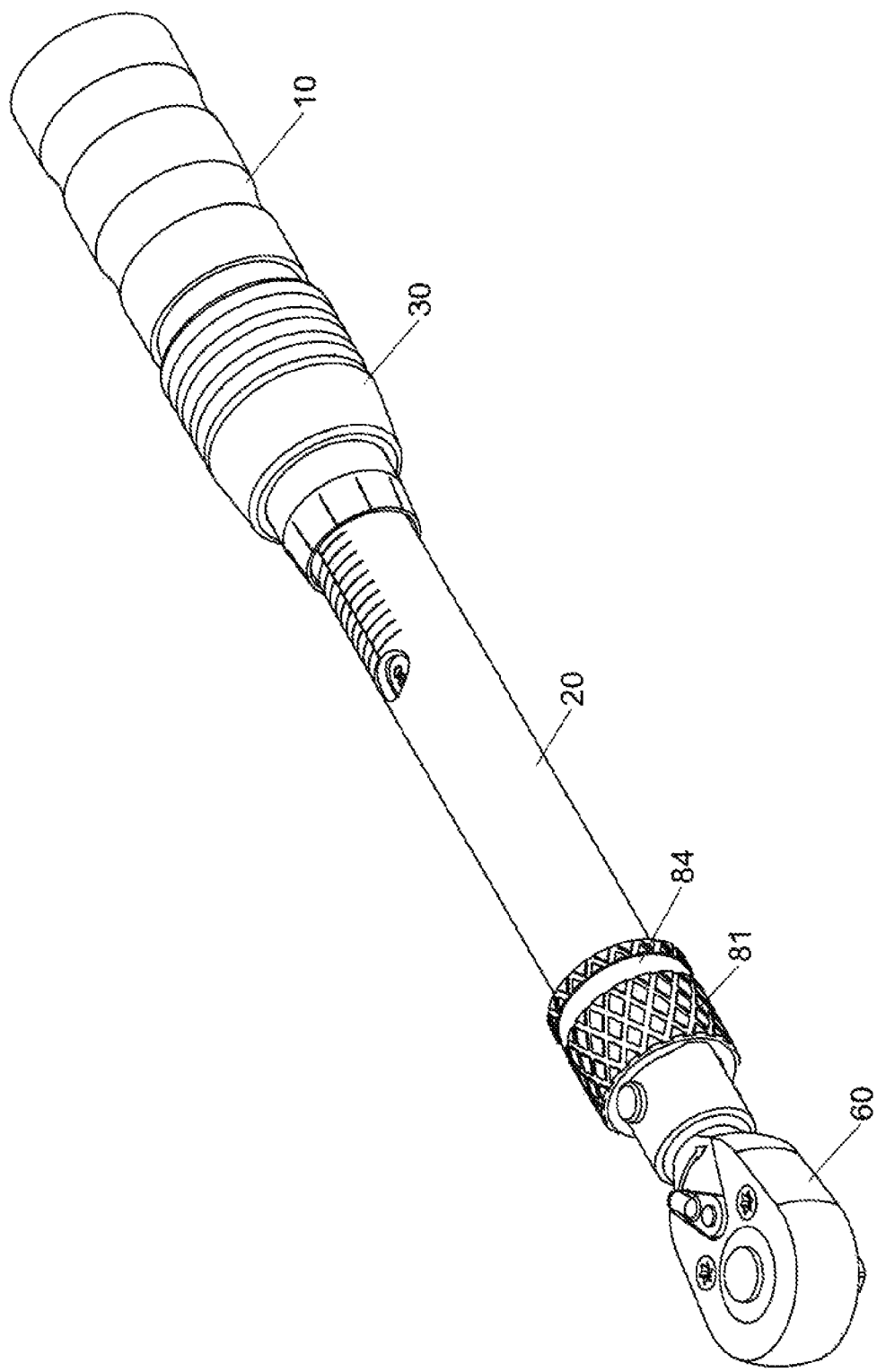
FIG. 10 is a perspective view of the torque structure in accordance with the preferred embodiment of the present invention.

Referring to FIG. 10 with reference to FIGS. 1-9, the second body 20 is assembled with the first body 10, and the first elastic member 27 is received in the second receiving chamber 21. The control unit 30 is mounted on the first body 10 and movable between a locking position where the first body 10 cannot be rotated relative to the second body 20, and an unlocking position where the first body 10 can be rotated relative to the second body 20. The fixing seat unit 40 is received in the second receiving chamber 21 and close to the opening of the second receiving chamber 21. The adjusting unit 50 extends through the first receiving chamber 11, the second receiving chamber 21, and the fixing seat unit 40. The adjusting unit 50 has a first end secured in the first receiving chamber 11 and a second end biased against the first elastic member 27. When the first body 10 is rotated and moved relative to the second body 20, the adjusting unit 50 is driven by the first body 10 to rotate and move relative to the fixing seat unit 40, so that the adjusting unit 50 is moved axially in the second receiving chamber 21 to adjust the length of the first elastic member 27 so as to adjust the torque value. The third body 60 is pivotally connected with the second body 20, with the drive portion 61 protruding from the second body 20.

Referring to FIGS. 11-16 with reference to FIGS. 1-10, the third body 60 is assembled with the second body 20, the second pivot portion 63 is pivotally connected with the first pivot portion 22, and the resting portion 65 is elastically biased against the first elastic member 27 so that the third body 60 has a torque slip function relative to the second body 20. The pivot rod 70 extends through the first pivot portion 22 and the second pivot portion 63 so that the second pivot portion 63 is pivotally connected with the first pivot portion 22, and the third body 60 is pivotally connected with the second body 20. The limit unit 80 is assembled with the second body 20 and the third body 60. The first retaining member 81 is pivotally mounted on the second body 20. The two second retaining members 82 are received in the two retaining grooves 23. The at least one positioning ball 83 is received in the first groove 24 and the at least one through hole 814. The elastomer 84 is received in the second groove 813 and presses the at least one positioning ball 83 so that the at least one positioning ball 83 is hidden in the first retaining member 81.

When the first retaining member 81 is rotated on the second body 20 to the disengaging position of the limit unit 80, the two second limit portions 811 align with the two retaining grooves 23, and the two second retaining members 82 align with the two second limit portions 811 as shown in FIG. 15, so that the two second retaining members 82 are detached and spaced from the first limit portion 64. Thus, the first limit portion 64 is not limited by the two second retaining members 82 so that the third body 60 is not limited by the limit unit 80, and the third body 60 is not limited relative to the second body 20. At this time, the at least one through hole 814 aligns with the at least one first positioning portion 241, and the at least one positioning ball 83 is pressed by the elastomer 84 and positioned in the at least one first positioning portion 241 as shown in FIG. 16, so that the first retaining member 81 is situated at the disengaging position of the limit unit 80. Thus, the third body 60 has a torque slip effect relative to the second body 20, and the torque structure is served as a torque wrench structure.

Referring to FIGS. 17-19 with reference to FIGS. 1-16, when the first retaining member 81 is rotated on the second body 20 to the engaging position of the limit unit 80, the two third limit portions 812 align with the two retaining grooves 23, and the two second retaining members 82 are pushed by the two third limit portions 812 to press the first limit portion 64 as shown in FIG. 18, so that the first limit portion 64 is clamped between the two second retaining members 82, and the third body 60 is locked by the limit unit 80. Thus, the third body 60 is restricted by the limit unit 80 so that the resting portion 65 cannot be moved, and the third body 60 is situated at a limited (or engaged) state relative to the second body 20. At this time, the at least one through hole 814 aligns with the at least one second positioning portion 242, and the at least one positioning ball 83 is pressed by the elastomer 84 and positioned in the at least one second positioning portion 242 as shown in FIG. 19, so that the first retaining member 81 is situated at the engaging position of the limit unit 80. Thus, the third body 60 does not have a torque slip effect relative to the second body 20, and the torque structure is served as a common wrench structure.

Figures 20, 21:
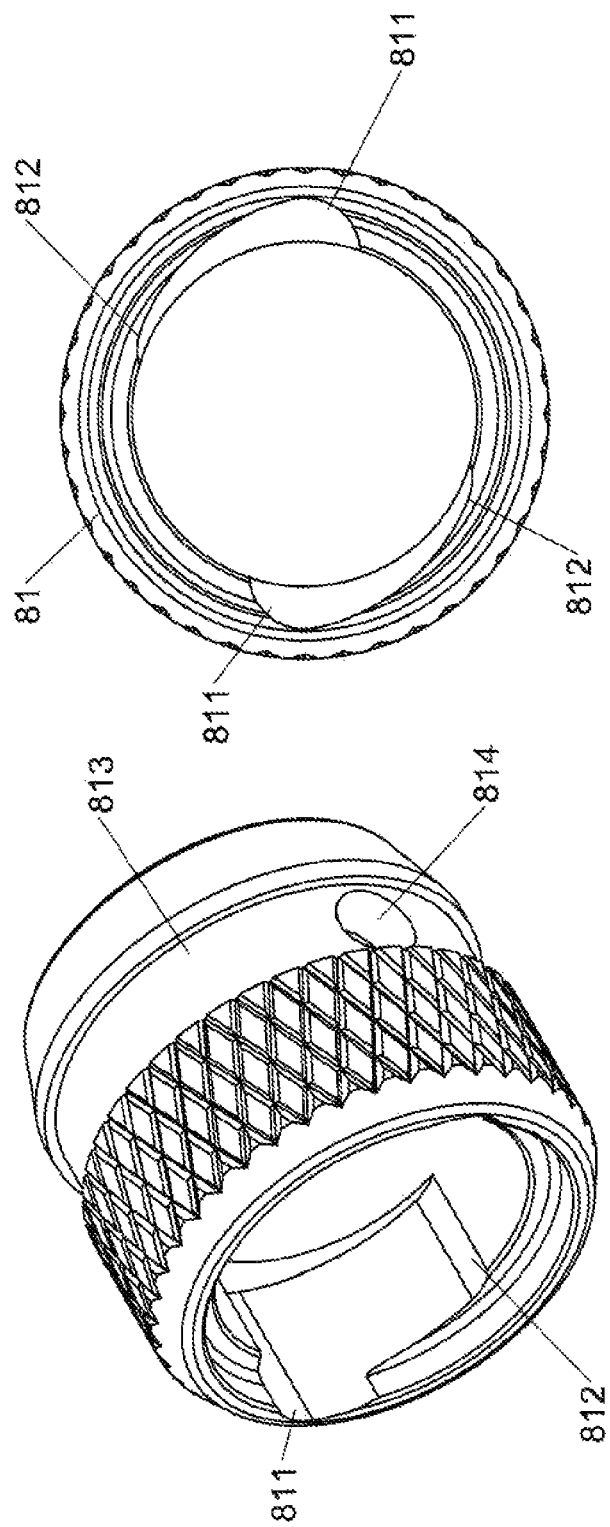
FIG. 20 is a perspective view of a first retaining member of the torque structure in accordance with another preferred embodiment of the present invention.
FIG. 21 is a front view of the first retaining member of the torque structure as shown in FIG. 20.

Referring to FIGS. 20 and 21 with reference to FIGS. 1-16, the first retaining member 81 is rotated on the second body 20 through an angle until the two second limit portions 811 or the two third limit portions 812 align with the two retaining grooves 23 and the two second retaining members 82, so that the first limit portion 64 is unlocked from or locked by the two second retaining members 82, and the third body 60 is released from or restricted by the limit unit 80, such that the third body 60 is situated at a disengaging state (or a non-limit state) or an engaging state (or a limit state) relative to the second body 20. As shown in FIG. 9, the first retaining member 81 is rotatable relative to the second body 20 through three hundred and sixty degrees (360°). As shown in FIG. 21, the first retaining member 81 is rotatable relative to the second body 20 through an angle only.

In the preferred embodiment of the present invention, the first body 10 is rotated and moved relative to the second body 20 to adjust the torque. In another preferred embodiment of the present invention, the first body 10 and the second body 20 are secured together. The first body 10 has a rear end provided with an adjusting mechanism to adjust the torque. Thus, the characteristic of the present invention is in that, the first retaining member 81 and the two second retaining members 82 are mounted between the second body 20 and the third body 60.

Accordingly, the torque structure of the present invention has the following advantages.

1. The limit unit 80 is rotated on the second body 20 between a disengaging position where the third body 60 is unlocked from the second body 20 and has a torque slip function relative to the second body 20 and a engaging position where the third body 60 is locked by the second body 20 and does not have a torque slip function relative to the second body 20. When the limit unit 80 is disposed at the disengaging position, the torque structure is served as a torque wrench structure. When the limit unit 80 is disposed at the engaging position, the third body 60 is restricted by the limit unit 80, and the resting portion 65 cannot be moved, so that the third body 60 does not have a torque slip effect relative to the second body 20, and the torque structure is served as a common wrench structure. Thus, the torque structure has two different functions to enhance the versatility thereof.

2. The limit unit 80 is rotated on the second body 20 between a disengaging position and a engaging position so that the third body 60 is situated at a disengaging or engaging state relative to the second body 20, and the third body 60 has or does not have a torque slip effect relative to the second body 20.

3. When the first retaining member 81 is rotated on the second body 20, the two second retaining members 82 align with the two second limit portions 811 or the two third limit portions 812, so that the two second retaining members 82 are unlocked from or locked onto the first limit portion 64, and the third body 60 is situated at a disengaging or engaging state relative to the second body 20. Thus, the torque structure is served as a torque wrench structure or a common wrench structure.

4. The limit unit 80 is rotated on the second body 20 between a disengaging position and a engaging position so that the third body 60 is situated at a disengaging or engaging state relative to the second body 20. When the first retaining member 81 is rotated on the second body 20, the two second limit portions 811 or the two third limit portions 812 align with the two retaining grooves 23, so that the two second retaining members 82 rest on the two second limit portions 811 or the two third limit portions 812, such that the two second retaining members 82 unlock or lock the first limit portion 64.

5. The at least one positioning ball 83 is received in the first groove 24 and the at least one through hole 814. When the first retaining member 81 is rotated on the second body 20, the at least one positioning ball 83 is rolled in the first groove 24. When the at least one through hole 814 aligns with the at least one first positioning portion 241 or the at least one second positioning portion 242, the at least one positioning ball 83 is positioned in the at least one first positioning portion 241 or the at least one second positioning portion 242, so that the first retaining member 81 is situated at the disengaging position or the engaging position. Thus, the at least one positioning ball 83 is used for positioning the first retaining member 81.

6. The elastomer 84 is received in the second groove 813 and presses the at least one positioning ball 83 so that the at least one positioning ball 83 is hidden in the first retaining member 81. Thus, the elastomer 84 provides an elastic damping force to the at least one positioning ball 83 when the at least one positioning ball 83 is rolled and moved in the first groove 24.

7. The limit unit 80 only includes the first retaining member 81, the two second retaining members 82, the at least one positioning ball 83, and the elastomer 84, so that the limit unit 80 has a simplified construction and a disengaging or engaging positioning effect.

8. When the first retaining member 81 is rotated on the second body 20 to the disengaging position, the two second limit portions 811 align with the two retaining grooves 23, and the two second retaining members 82 align with the two second limit portions 811 as shown in FIG. 15, so that the first limit portion 64 is released from the two second retaining members 82, and the third body 60 is unlocked from the limit unit 80 and situated at the disengaging position relative to the second body 20. At this time, the at least one through hole 814 aligns with the at least one first positioning portion 241, and the at least one positioning ball 83 is positioned in the at least one first positioning portion 241 as shown in FIG. 16, so that the first retaining member 81 is situated at the disengaging position. Thus, the third body 60 has a torque slip effect relative to the second body 20.

9. When the first retaining member 81 is rotated on the second body 20 to the engaging position of the limit unit 80, the two third limit portions 812 align with the two retaining grooves 23, and the two second retaining members 82 are pushed by the two third limit portions 812 to press the first limit portion 64 as shown in FIG. 18, so that the third body 60 is limited by the limit unit 80 and situated at the engaging position relative to the second body 20. At this time, the at least one through hole 814 aligns with the at least one second positioning portion 242, and the at least one positioning ball 83 is positioned in the at least one second positioning portion 242 as shown in FIG. 19, so that the first retaining member 81 is situated at the engaging position. Thus, the third body 60 does not have a torque slip effect relative to the second body 20.

10. When the control sleeve 31 is situated at the unlocking position, the first body 10 can be rotated relative to the second body 20, and the positioning member 34 is moved on the second body 20 and positioned in any one of the positioning channels 25. The positioning member 34 is pushed by the wall of the second body 20, and the second ring 35 is pushed and expanded outward by the positioning member 34 when the first body 10 is rotated relative to the second body 20. When the positioning member 34 is moved from one to another one of the positioning channels 25, the positioning member 34 is pressed inward by the restoring force of the second ring 35, so that the positioning member 34 is retracted into another one of the positioning channels 25. Thus, a clear sound is produced when the positioning member 34 is forced into and locked in each of the positioning channels 25 to provide an audio indication to the user. Therefore, the user is easy to know rotation of the adjusting unit 50 for adjusting the torque and clearly notices that the positioning member 34 is positioned in one of the positioning channels 25. The control sleeve 31 is moved and returned to the locking position after the torque of the torque structure is adjusted to the required value.

11. The positioning member 34 is pressed by the restoring force of the second ring 35, so that the positioning member 34 is retracted into one of the positioning channels 25. Thus, the positioning member 34 is moved on the positioning channels 25, so that the sound is clear and exact to indicate that the positioning member 34 is locked in each of the positioning channels 25.

12. The positioning channels 25 are hidden in the first body 10 so that the user cannot see the positioning channels 25 and has to judge if the positioning member 34 is retracted into one of the positioning channels 25 by the hinting sound.

13. When the control sleeve 31 is moved on the first body 10 in a direction opposite to the second body 20 toward the unlocking position, the second elastic member 32 is compressed by the second abutting edge 312, and the first ring 33 is detached from the peripheral face of the spring recess 311 so that the first ring 33 is expanded outward and rests on the second conic groove 316, and the control sleeve 31 is positioned at the unlocking position by the first ring 33. Thus, the user needs not to push the control sleeve 31 constantly and can rotate the first body 10 conveniently. When the first ring 33 is expanded outward and rests on the second conic groove 316, sound is also produced during expansion of the first ring 33 to indicate that the control sleeve 31 is disposed at the unlocking position.

14. Clear sound is produced when the first body 10 is rotated relative to the second body 20 and when the control sleeve 31 is disposed at the unlocking position to remind the user during torque adjustment of the torque wrench.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the scope of the invention.

The invention claimed is:

1. A torque structure comprising:
   a first body, a second body, a first elastic member, a third body, a pivot rod, and a limit unit;
   wherein:
   the second body is assembled with the first body and has an interior provided with a second receiving chamber;
   the second body has a first end provided with a first pivot portion, two retaining grooves, and a first groove;
   the first pivot portion is connected to the second receiving chamber;
   the two retaining grooves are connected to the second receiving chamber;
   the first groove has an annular shape;
   the two retaining grooves which are arranged between the first pivot portion and the first groove;
   the first groove is provided with at least one first positioning portion and at least one second positioning portion;
   each of the at least one first positioning portion and the at least one second positioning portion has a depth slightly more than that of the first groove;
   the first elastic member is received in the second receiving chamber;
   the third body is pivotally connected with the second body and has a first end provided with a drive portion protruding from the second body;
   the third body is provided with a pivot seat pivotally mounted in the second receiving chamber;
   the pivot seat is provided with a second pivot portion pivotally connected with the first pivot portion;
   the third body is provided with a first limit portion aligning with the two retaining grooves;

the first limit portion is connected with the pivot seat which is arranged between the drive portion and the first limit portion;
the pivot rod extends through the first pivot portion and the second pivot portion so that the third body is pivotally connected with the second body;
the limit unit is assembled with the second body and the third body;
the limit unit is rotated on the second body between a disengaging position where the third body is unlocked from the second body and a engaging position where the third body is locked by the second body;
the limit unit includes a first retaining member, two second retaining members, at least one positioning ball, and an elastomer;
the first retaining member is pivotally mounted on the second body;
the first retaining member has an inner peripheral face provided with two second limit portions and two third limit portions;
each of the two second limit portions is connected to each of the two third limit portions and has a depth more than that of each of the two third limit portions;
the two second limit portions align with each other, and the two third limit portions align with each other;
each of the two second limit portions is a recessed arcuate face;
each of the two third limit portions is an arcuate face;
the first retaining member has an outer peripheral face provided with a second groove;
the second groove has an annular shape and is provided with at least one through hole aligning with the at least one first positioning portion or the at least one second positioning portion;
the two second retaining members are received in the two retaining grooves and hidden in the first retaining member;
the first limit portion is arranged between the two second retaining members;
when the first retaining member is rotated on the second body, the two second retaining members align with the two second limit portions or the two third limit portions, so that the two second retaining members are unlocked from or locked onto the first limit portion, and the third body is released from or restricted by the second body;
the at least one positioning ball is received in the first groove and the at least one through hole;
when the first retaining member is rotated on the second body, the at least one positioning ball is rolled in the first groove;
when the at least one through hole aligns with the at least one first positioning portion or the at least one second positioning portion, the at least one positioning ball is positioned in the at least one first positioning portion or the at least one second positioning portion;
the elastomer is received in the second groove and presses the at least one positioning ball so that the at least one positioning ball is hidden in the first retaining member;
the elastomer has an annular shape;
when the at least one positioning ball is received in the first groove, the elastomer is pushed and expanded outward by the at least one positioning ball;
when the first retaining member is rotated on the second body to the disengaging position of the limit unit, the two second limit portions align with the two retaining grooves, and the two second retaining members align with the two second limit portions, so that the two second retaining members are unlocked from the first limit portion, and the third body is unlocked from the limit unit and released from the second body;
the at least one through hole aligns with the at least one first positioning portion, and the at least one positioning ball is pressed by the elastomer and positioned in the at least one first positioning portion;
the third body is pivoted about the first pivot portion and swiveled through an angle, so that the third body has a torque slip effect relative to the second body;
when the first retaining member is rotated on the second body to the engaging position of the limit unit, the two third limit portions align with the two retaining grooves, and the two second retaining members are pushed by the two third limit portions to press the first limit portion, so that the first limit portion is sandwiched between the two second retaining members, and the third body is locked by the limit unit; and
the at least one through hole aligns with the at least one second positioning portion, and the at least one positioning ball is pressed by the elastomer and positioned in the at least one second positioning portion.

2. The torque structure as claimed in claim 1, wherein:
the first body has an interior provided with a first receiving chamber;
the first body is provided with a slot connected to the first receiving chamber;
the slot has an elongate shape;
the first body is provided with a first annular groove;
the first body is provided with two receiving recesses;
the first body is provided with a ball hole connected to the first receiving chamber; and
the first body is provided with a first abutting edge arranged between the first annular groove and the slot.

3. The torque structure as claimed in claim 2, wherein:
the second receiving chamber extends through a whole length of the second body;
the first pivot portion has an axis perpendicular to that of the second receiving chamber;
the two retaining grooves have an axis perpendicular to that of the second receiving chamber;
the second body has a second end provided with a plurality of positioning channels hidden in the first receiving chamber; and
the first body is rotated relative to the second body until the slot aligns with one of the positioning channels.

4. The torque structure as claimed in claim 1, wherein:
the third body has a second end provided with a resting portion biased against the first elastic member; and
the first limit portion is arranged between the pivot seat and the resting portion.

5. The torque structure as claimed in claim 3, further comprising:
a control unit mounted on the first body and movable between a locking position where the first body cannot be rotated relative to the second body so that the torque state cannot be adjusted, and an unlocking position where the first body can be rotated relative to the second body so that the torque state can be adjusted.

6. The torque structure as claimed in claim 5, wherein:
the control unit includes a control sleeve, a second elastic member, a first ring, a positioning member, a second ring, and a ball;
the control sleeve is mounted on the first body and movable axially on the first body;

the control sleeve has an interior provided with a spring recess;

the spring recess has a bottom provided with a second abutting edge;

the control sleeve is provided with a first peripheral face and a second peripheral face;

the second abutting edge is arranged between the spring recess and the first peripheral face;

the first peripheral face has a diameter less than that of the spring recess and is arranged between the second abutting edge and the second peripheral face;

the second peripheral face has a diameter more than that of the first peripheral face;

the control sleeve is provided with a first conic groove which is arranged between the first peripheral face and the second peripheral face and enlarged from the first peripheral face to the second peripheral face;

the first peripheral face is arranged between the second abutting edge and the first conic groove;

the control sleeve is provided with a second conic groove which is arranged in the spring recess;

the second conic groove is enlarged from the opening of the spring recess to the second abutting edge;

the second abutting edge is arranged between the first peripheral face and the second conic groove;

the second elastic member is mounted on the first body and elastically biased against the control sleeve to push the control sleeve from the unlocking position to the locking position;

the second elastic member is received in the spring recess and has a first end elastically biased against the first abutting edge and a second end elastically biased against the second abutting edge;

the first ring is mounted in the first annular groove and hidden in the control sleeve;

the first ring is elastically expandable outward;

the first ring rests on a peripheral face of the spring recess when the control sleeve is axially moved to the locking position, and is expanded outward to rest on the second conic groove when the control sleeve is axially moved to the unlocking position;

the positioning member is received in the slot and hidden in the control sleeve;

the positioning member is releasably locked in one of the positioning channels;

the positioning member is provided with a second annular groove;

the second ring is mounted on the first body and the second annular groove and has an elastic restoring force;

the second ring has two receiving portions formed on two ends thereof and received in the two receiving recesses;

the positioning member is limited by the second ring;

the ball is received in the ball hole and hidden in the control sleeve;

the ball rests on the first conic groove of the control sleeve; and the control sleeve is limited by the ball.

7. The torque structure as claimed in claim 6, wherein:
when the control sleeve is situated at the locking position, the second elastic member pushes the control sleeve toward the first pivot portion, so that the first ring rests on the peripheral face of the spring recess;

one end of the positioning member is pressed by the first peripheral face, and the positioning member is partially retracted into the slot, so that the positioning member is locked in one of the positioning channels;

the first body and the second body are locked by the positioning member, so that the first body cannot be rotated relative to the second body;

the other end of the positioning member aligns with the second peripheral face and the first conic groove, and the ball partially protrudes from the ball hole and rests on the first conic groove;

when the control sleeve is moved on the first body in a direction opposite to the second body toward the unlocking position, the second elastic member is compressed by the second abutting edge, and the first ring is detached from the peripheral face of the spring recess so that the first ring is expanded outward and rests on the second conic groove, and the control sleeve is situated at the unlocking position by the first ring;

one end of the positioning member is detached from the first peripheral face, the positioning member is restricted by the second ring, and the ball is distant from the first conic groove, so that the first body can be rotated relative to the second body, and the positioning member is moved on the second body and positioned in any one of the positioning channels;

the positioning member is pushed by the wall of the second body, and the second ring is pushed and expanded outward by the positioning member when the first body is rotated relative to the second body;

when the positioning member is moved from one to another one of the positioning channels, the positioning member is pressed inward by the restoring force of the second ring, so that the positioning member is retracted into another one of the positioning channels; and a clear sound is produced when the positioning member is forced into and locked in each of the positioning channels.

8. The torque structure as claimed in claim 2, further comprising:
a fixing seat unit secured in the second receiving chamber and distant from the first pivot portion.

9. The torque structure as claimed in claim 8, further comprising:
an adjusting unit assembled with the first body, the second body, and the fixing seat unit;
wherein:
the adjusting unit has a first end secured in the first receiving chamber and a second end biased against the first elastic member;
the adjusting unit is screwed into and movable relative to the fixing seat unit; and
when the first body is rotated and moved relative to the second body, the adjusting unit is driven by the first body to rotate and move relative to the fixing seat unit, so that the adjusting unit is moved axially in the second receiving chamber.

\* \* \* \* \*